(12) United States Patent
Duineveld et al.

(10) Patent No.: US 8,479,641 B2
(45) Date of Patent: *Jul. 9, 2013

(54) TEA MAKING DEVICE HAVING AN IMPROVED LIQUID COLLECTION CHAMBER

(75) Inventors: Paulus Cornelis Duineveld, Drachten (NL); Henk Borg, Hoogeveen (NL); Willem Sjouke Wijma, Openide (NL); Cornelis Frederik Akerboom, Hoogeveen (NL); Gustaaf Frans Brouwer, Nijkerk (NL); Hendrik Cornelis Koeling, Amersfoort (NL); Gerbrand Kristiaan de Graaff, Lisse (NL); Philippe Jacques van Camp, Utrecht (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,605

(22) Filed: Jan. 23, 2012

(65) Prior Publication Data

US 2012/0118167 A1 May 17, 2012

Related U.S. Application Data

(63) Continuation of application No. 12/094,197, filed as application No. PCT/IB2006/054503 on Nov. 29, 2006, now Pat. No. 8,113,106.

(30) Foreign Application Priority Data

Dec. 1, 2005 (EP) ................................. 05111559

(51) Int. Cl.
A47J 31/06 (2006.01)
(52) U.S. Cl.
USPC .............................................. 99/295
(58) Field of Classification Search
USPC ................. 99/299, 323, 295, 306, 307, 304
See application file for complete search history.

(56) References Cited

U.S. PATENT DOCUMENTS

| 6,009,792 | A | 1/2000 | Kraan |
| 6,119,582 | A | 9/2000 | Akkerman-Theunisse et al. |
| 7,703,381 | B2 | 4/2010 | Liverani et al. |
| 7,836,819 | B2 | 11/2010 | Suggi Liverani et al. |
| 2004/0005384 | A1 | 1/2004 | Cai |
| 2004/0241307 | A1 | 12/2004 | Knitel |
| 2007/0186784 | A1 | 8/2007 | Liverani et al. |
| 2007/0289453 | A1 | 12/2007 | Halliday et al. |

FOREIGN PATENT DOCUMENTS

| EP | 878158 | 11/1998 |
| EP | 904718 | 3/1999 |
| EP | 03026470 | 4/2003 |
| EP | 2007008067 | 1/2007 |
| WO | 2005016092 A1 | 2/2005 |

Primary Examiner — Raleigh W Chiu

(57) ABSTRACT

A device for making tea, which device comprises a brewing chamber (2) for enclosing a tea-pad, means for supplying heated water through one or more openings in the upper wall of the brewing chamber, and a restricted opening (8) in the lower wall (1) of the brewing chamber (2), so that tea is squirted into a liquid collection chamber (10) underneath the brewing chamber (2). The lower wall (11) of the liquid collection chamber (10) is provided with a substantial circular ridge (14) around the location where the tea hits the lower wall (11) of the liquid collection chamber (10).

15 Claims, 2 Drawing Sheets

TEA MAKING DEVICE HAVING AN IMPROVED LIQUID COLLECTION CHAMBER

This is a continuation of U.S. patent application Ser. No. 12/094,197, filed on May 19, 2008, which is a national stage application under 35 U.S.C. §371 of International Application No. PCT/IB2006/054503 filed on Nov. 29, 2006, which claims priority to European Application No. EP05111559 filed on Dec. 1, 2005, which are incorporated herein by reference.

The invention is related to a device for making tea, whereby the device comprises a brewing chamber for enclosing a tea-pad, means for supplying heated water through one or more openings in the upper wall of the brewing chamber, and one or more restricted openings in the lower wall of the brewing chamber, so that tea is squirted into a liquid collection chamber underneath the brewing chamber.

Such device is described in WO-A-2005/016092. The described device comprises a water reservoir and means for heating the water and pumping it to the holes in the upper wall of the brewing chamber, so that the heated water can enter the brewing chamber under pressure. The brewing chamber can be filled with a tea-pad containing pieces of tea leafs. The heated water will pass through the tea-pad, so that tea is extracted. After the extraction process, the brewed tea leaves the brewing chamber through a restricted opening in the lower wall (the bottom) of the brewing chamber, whereby it is squirted against the lower wall (the bottom) of the liquid collection chamber, which liquid collection chamber is located underneath the brewing chamber. From the liquid collection chamber, the tea is further guided to a tea outflow member for filling one or two cups standing near the device. The portion of the device comprising the upper wall of the brewing chamber can hinge upwardly with respect to the stationary part of the device comprising the brewing chamber and the liquid collection chamber, so that the brewing chamber can be opened and a new tea-pad can be inserted in the brewing chamber for the next extraction process.

In order to achieve an optimal extraction process, the heated water has to stay for a certain time in the brewing chamber, and therefore the outflow opening in the lower wall of the brewing chamber has a relative small dimension, so that the outflow of the tea is restricted. Such restricted opening causes a liquid jet, so that the tea squirts against the bottom of the liquid collection chamber. After hitting that bottom, the tea is spread out over the lower wall of the liquid collection chamber, whereby air inclusions (air bubbles) in the tea are initiated, resulting in some foam, or even a layer of foam on the brewed tea.

However, foam in the brewed tea has to be limited or, if possible, has to be avoided, because foam decreases the quality of the tea. Although some foam on the upper surface of the tea does not affect the taste of the tea, in general, the presence of foam is not appreciated by tea drinking persons. In case the same device is also used for making coffee, the creation of foam is a positive effect of the brewing process, because foam increases the quality of the brewed coffee.

An object of the invention is a device for making tea comprising a brewing chamber for enclosing a tea-pad, whereby the tea is flowing from the brewing chamber to the liquid collection chamber through a restricted opening in the lower wall of the brewing chamber, whereby the creation of foam is reduced.

Another object of the invention is to reduce the quantity of residual tea in the liquid collection chamber after the tea is brewed. Thereby, the merging of fresh brewed tea with residual tea from a former brewing process is reduced. Furthermore, the presence of residual tea requires more frequent rinsing and/or cleaning of the liquid collection chamber.

To accomplish with one or both of these objects, the lower wall of the liquid collection chamber is provided with a substantial circular ridge around the location where the tea hits the lower wall of the liquid collection chamber. After the tea hits the lower wall of the liquid collection chamber, the tea is spread out over the lower wall, whereby the speed of the liquid flow decreases during its motion over that lower wall. It has been found out that heavy turbulence arises in the liquid flow when the flow hits the side wall of the liquid collection chamber. It has appeared that said turbulence causes the creation of foam in the tea. Furthermore, it has been found that such creation of foam can be reduced by introducing an obstacle like a ridge on the lower wall of the liquid collection chamber, whereby the liquid flow passes over the ridge before it hits the side wall of the liquid collection chamber. Therefore, a circular ridge on the bottom of the liquid collection chamber reduces effectively the creation of foam in the tea in an effective way.

In a preferred embodiment, the diameter of the substantial circular ridge is between 25 mm and 60 mm, and preferably between 35 mm and 50 mm. Of course, the optimal diameter of the substantial circular ridge depends from the speed of the liquid that is spreading out over the lower wall of the liquid collection chamber, but a diameter as mentioned above has given satisfying results.

Preferably, the height of the substantial circular ridge is between 0.05 mm and 5 mm, and more preferably between 1.5 mm and 4 mm. A relative small height has already a foam reducing effect on the liquid flow, but a height between 1.5 mm and 4 mm reduces the creation of foam considerably.

In a preferred embodiment, the lower wall of the liquid collection chamber has a raised portion at the location where the tea hits said lower wall, so that the tea is flowing over a slope downwards to the substantial circular ridge. By experimentation it has been found out that the presence of such slope at the bottom of the liquid collection chamber further reduces the creation of foam in the tea. The slope may extend over a major part of the lower wall of the liquid collection chamber or may extend only over a smaller part, for example an annular portion, of said lower wall. Preferable, the slope has an angle between 1° and 20° with respect to the horizontal plane, more preferable an angle between 3° and 10°.

In order to make sure that all tea can leave the space that is surrounded by the substantial circular ridge, in a preferred embodiment, the substantial circular ridge has an interruption forming a pass-through for liquid. Most of the tea will pass the substantial circular ridge by flowing over the ridge, but after the tea supply to the liquid collection chamber is finished, the last quantity of tea can leave the area surrounded by the ridge through said pass-through in said circular ridge.

Preferably, the lower wall of the liquid collection chamber is substantially positioned in an inclined plane, whereby the substantial circular ridge is present on the inclined lower wall of the liquid collection chamber. Thereby, the interruption of the substantial circular ridge is located at the lowest part of said ridge.

It has been found that foam can also be created by liquid drops falling on the radial directed liquid flow over the bottom of the liquid collection chamber. Therefore, in a preferred embodiment, means are present for reducing liquid drops falling down in the area within the substantial circular ridge from the upper wall of the liquid collection chamber. The presence of such means can be regarded as a separate invention aiming at reducing foam in the tea, which invention can be applied in combination with, but also in absence of, said substantial circular ridge.

In a preferred embodiment, said means for reducing liquid drops falling down is a layer of porous material on at least the central part of the upper wall of the liquid collection chamber. The porous material will absorb the liquid (water) that may condense on it, so that there is no liquid that may form drops at the surface of the upper wall of the liquid collection chamber where the layer of porous material is present.

Preferably, at least the central part of the surface of the upper wall of the liquid collection chamber is inclined, so that drops of condensed liquid will not fall down, but will slide along the surface of the upper wall of the liquid collection chamber downwardly. Thereby the liquid can be guided to a location where it can fall down without causing foam, or to the side wall of the liquid collection chamber in order to further slide down along said side wall. In a preferred embodiment, at least a main part of the surface of the upper wall of the liquid collection chamber has a substantial conical shape, so that the upper wall is sloping down towards the side wall of the liquid collection chamber. The inclination of the central part of the upper wall of the liquid collection chamber is preferably at least 1° and more preferably between 3° and 10°.

In a preferred embodiment, the lower wall of the liquid collection chamber is substantially positioned in an inclined plane, so that the lowest portion of said lower wall is at a location at the edge of said lower wall, whereby said lowest portion is provided with an oblong outflow opening along said edge, whereby a guiding surface abuts on said oblong outflow opening for guiding the tea downwardly towards a tea outflow member. By guiding the tea to the tea outflow member, the creation of foam is avoided. In case the tea would be guided through a tube, the tube may remain filled with tea after the tea stops flowing, because of the capillary action of the tube. By making use of a guiding surface, there is no remaining tea and furthermore there is no creation of foam in the tea.

The tea guiding surface instead of a tea guiding tube can be applied in combination with said substantial circular ridge and/or said means for reducing liquid drops falling down from the upper wall of the liquid collection chamber, but it can also be applied separately, so that it can be considered as a separate invention.

In a preferred embodiment, the guiding surface abuts on the lower edge of the side wall of the liquid collection chamber, which edge is also the edge of the oblong outflow opening. Thereby, the tea flows automatically against said guiding surface when it leaves the lower wall of the liquid collection chamber, so that it can be further guided in downward direction.

Preferably, the lower wall of the liquid collection chamber is provided with a channel for guiding liquid in the direction of an outflow opening at the edge of the lower wall, so that the quantity of residual liquid after the brewing process is reduced.

The invention is furthermore related to a removable part of the device as described above, which removable part comprises the lower wall of the brewing chamber and the liquid collection chamber. The removable part may also comprise the tea outflow member. The part can be removed in order to rinse it or to clean it, for example in a dishwasher.

The invention will now be further elucidated by means of a description of a part of the tea making device, which part comprises the lower wall of the brewing chamber and the complete liquid collection chamber. Thereby, reference is made to the drawing comprising three sectional views of said part of the tea making device, in which.

The figures are only diagrammatic representations, whereby only parts that are relevant for the elucidation of the invention are indicated.

Figure 1:
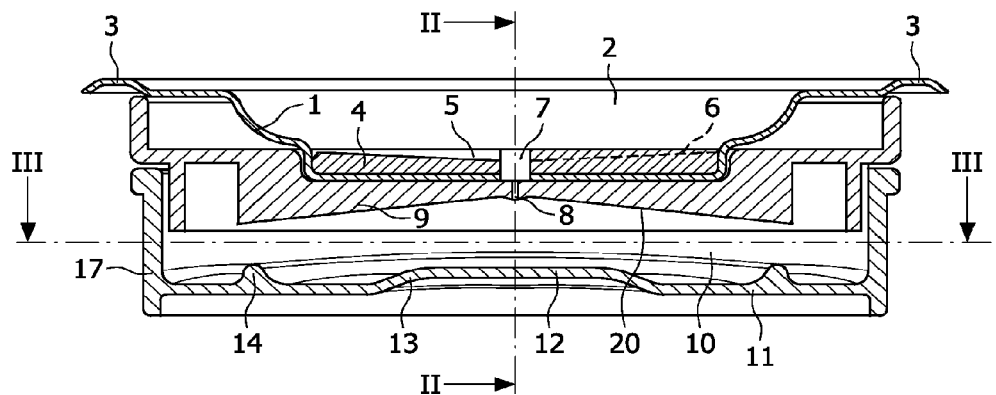
FIG. 1 is a sectional view indicated with arrows I in FIGS. 2 and 3.
Figure 2:
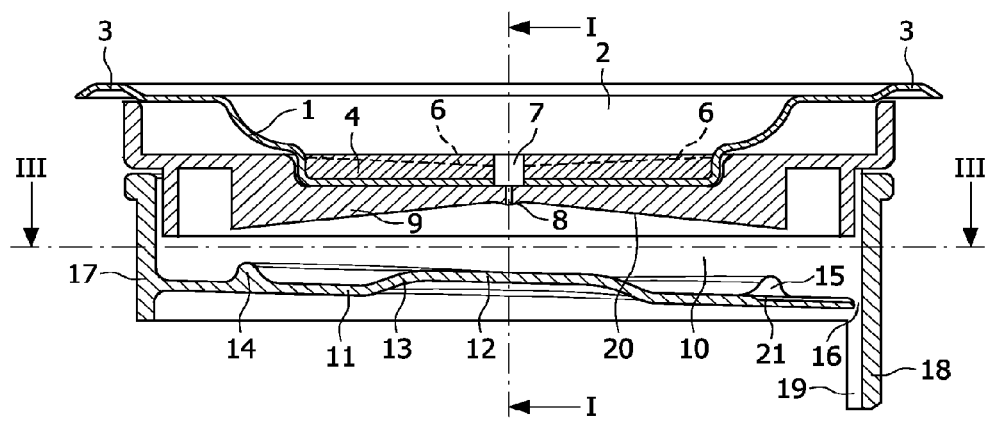
FIG. 2 is a sectional view indicated with arrows II in FIGS. 1 and 3.
Figure 3:
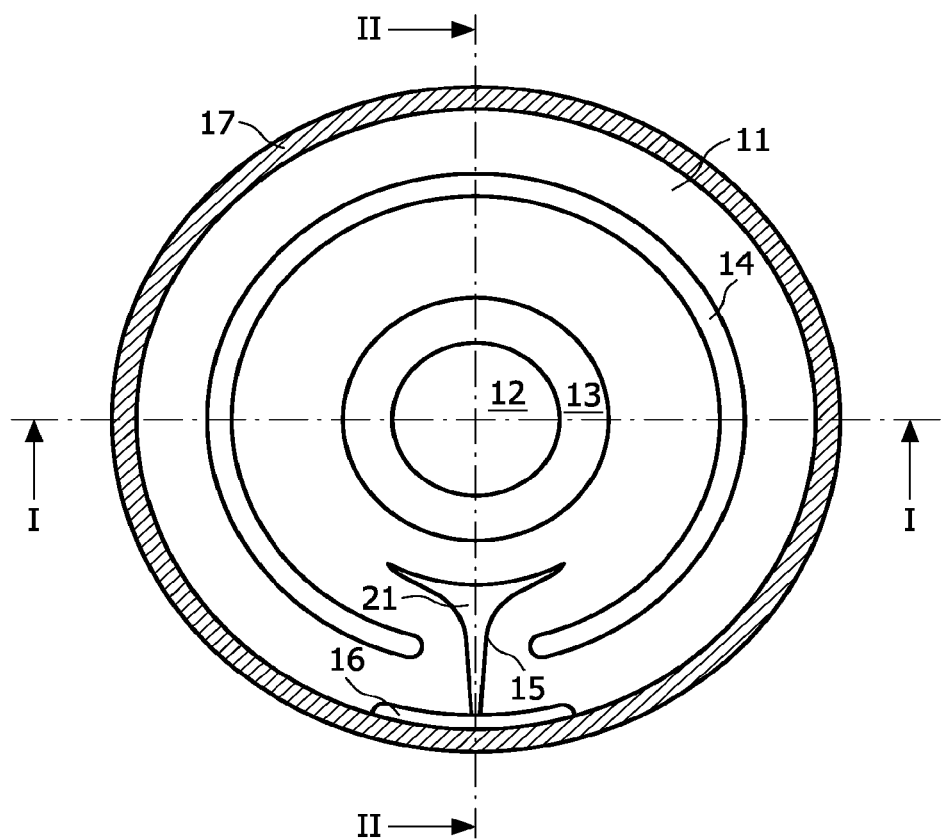
FIG. 3 is a sectional view indicated with arrows III in FIGS. 1 and 2.

FIGS. 1 and 2 show the lower wall 1 of the brewing chamber 2, which lower wall 1 is made by deforming a metal plate. The circular edge 3 of the lower wall 1 can abut against the substantial flat lower surface of the upper wall (not shown) of the brewing chamber 2, which upper wall can be hinged away in order to replace the tea-pad (not shown) that can be present in the brewing chamber 2. Said upper wall of the brewing chamber 2 is provided with a number of openings in order to supply heated water to the brewing chamber 2, which water can pass through the tea-pad, whereby tea is extracted.

The lower part of wall 1 is covered with a disc-like drainage member 4, which drainage member 4 is provided with channels 5 (grooves or recesses) at its upper surface. The drainage member 4 is made of plastic material and the channels 5 are positioned in radial direction. FIG. 1 shows one channel 5 and other channels 5 are indicated with striped lines 6 in FIGS. 1 and 2. The extracted tea can leave the tea-pad through these channels 5. The upper surface of drainage member 4 can be provided with other recesses, for example the recesses between vertical cylindrical protrusions. The brewed tea can flow from the tea-pad through these recesses 5 to the central recess 7 and can leave the brewing chamber 2 through the restricted opening 8. Restricted opening 8 is present in a member 9 of plastic material, which member 9 is attached to the lower side of the lower wall 1 of the brewing chamber 2.

As shown in FIGS. 1 and 2, a liquid collection chamber 10 is present underneath the brewing chamber 2. The lower wall 11 of the liquid collection chamber has a central horizontal portion 12, which portion 12 is raised with respect to the surrounding part of the lower wall 11. Around the raised portion 12 is an annular inclined portion 13 of the lower wall 11. Further away from the central horizontal portion 12 is a circular ridge 14. The lower wall 11 is inclined, as is shown in FIG. 2, except for the central horizontal portion 12. In the lower portion of the circular ridge 14 is an interruption 15, where liquid can flow to the lowest portion of the lower wall 11. In that lowest portion of the lower wall 11 is an oblong opening 16 forming an outflow opening for the brewed tea.

The liquid collection chamber 10 has a substantial cylindrical side wall 17. The upper part of side wall 17 is attached to member 9. The side wall 17 of the liquid collection chamber 10 has an extended portion 18 in downward direction at the location of the oblong outflow opening 16, which extended portion 18 forms a vertical guiding surface 19 for the tea flowing through the oblong outflow opening 16.

The tea is flowing from the brewing chamber 2 through the restricted opening 8 and is squirting against the central horizontal portion 12 of the lower wall 11 of the liquid collection chamber 10. Then, the tea is flowing in radial outward direction over the upper surface of the lower wall 11. It passes the inclined portion 13 and subsequently flows over the circular ridge 14. The presence of the ridge avoids the creation of foam when the tea reaches the side wall 17 of the liquid collection chamber 10. Subsequently, the tea is flowing to the lowest portion of the lower wall 11 and leaves the liquid collection chamber 10 through the oblong outflow opening 16. The tea is guided by the vertical guiding surface 19 to a tea outflow member (not shown) for filling one or two cups standing near the device.

The liquid in the liquid collection chamber 10 is warm, and therefore water may condense on the walls of the liquid collection chamber 10. In case water condenses on the upper wall of the liquid collection chamber 10, water drops may fall down, and it has found that such drops cause foam in the tea when the drops fall into the flow of tea in the central portion 12,13 of the lower wall 11. Therefore, the central portion of the lower side of member 9 has a conical-shaped concave surface 20, so that water drops do not fall from that central portion, but will slide along the conical-shaped surface to a location further away from the central portion 12,13 of the lower wall 11, in the shown embodiment even outside the circular ridge 14.

In order to further improve the outflow of residual liquid from the liquid collection chamber, upper surface of the lower wall 11 is provided with a channel or groove 21 to guide the liquid towards the oblong outflow opening 16.

The embodiment of the device for making tea as described above is only an example, many other embodiments are possible.

The invention claimed is:

1. A device for making tea comprising:
   a brewing chamber for enclosing a tea-pad,
   means for supplying heated water through one or more openings in the upper wall of the brewing chamber,
   a restricted opening in the lower wall of the brewing chamber, so that tea is squirted into a liquid collection chamber underneath the brewing chamber, and
   a further means for reducing liquid drops falling from at least a part of the upper wall of the liquid collection chamber,
   wherein the further means has a conical-shaped concave surface toward the restricted opening.

2. A device as claimed in claim 1, wherein a lower wall of the liquid collection chamber is provided with a substantial circular ridge around the location where the tea hits the lower wall of the liquid collection chamber between the location where the tea hits the lower wall of the liquid collection chamber and a wall enclosing the liquid collection chamber.

3. A device as claimed in claim 2, wherein the diameter of the substantial circular ridge between 25 mm and 60 mm.

4. A device as claimed in claim 2, wherein the diameter of the substantial circular ridge is between 35 mm and 50 mm.

5. A device as claimed in claim 2, wherein the height of the substantial circular ridge is between 0.05 mm and 5mm.

6. A device as claimed in claim 2, wherein the height of the substantial circular ridge is between 1.5 mm and 4 mm.

7. A device as claimed in claim 2, wherein the lower wall of the liquid collection chamber has a raised portion at the location where the tea hits said lower wall, so that the tea is flowing over a slope downwards to the substantial circular ridge.

8. A device as claimed in claim 2, wherein the substantial circular ridge has an interruption in order to form a pass-through for liquid.

9. A device as claimed in claim 2, wherein the lower wall of the liquid collection chamber is substantially positioned in an inclined plane, so that the lowest portion of said lower wall is at a location at the edge of said lower wall whereby said lowest portion is provided with an oblong outflow opening along said edge, whereby a guiding surface abuts on said oblong outflow opening for guiding the tea downwardly towards a tea outflow member.

10. A device as claimed in claim 9, wherein the guiding surface abuts on the lower edge of the side wall of the liquid collection chamber, which edge is also the edge of the oblong outflow opening.

11. A device as claimed in claim 2, wherein the lower wall of the liquid collection chamber is provided with a channel for guiding liquid in the direction of an outflow opening at the edge of the lower wall.

12. A device as claimed in claim 1, wherein at least the central part of the upper wall of the liquid collection chamber is provided with a layer of porous material.

13. A device as claimed in claim 1, wherein the liquid drops slide along the surface toward walls of the liquid collection chamber.

14. A device as claimed in claim 13, wherein the liquid drops fall substantially away from a central portion of the lower wall of the liquid collection chamber.

15. A removable part of the device according to claim 1, comprising the lower wall of the brewing chamber and the liquid collection chamber.

* * * * *